United States Patent Office 3,085,089
Patented Apr. 9, 1963

3,085,089
11,18;18:20-BIS-OXIDO-PREGNENES AND PROCESS FOR THE PREPARATION THEREOF
Albert Wettstein, Riehen, and Karl Heusler and Peter Wieland, Basel, Switzerland, assignors to Ciba Corporation, a corporation of Delaware
No Drawing. Filed Feb. 16, 1961, Ser. No. 89,664
Claims priority, application Switzerland Feb. 19, 1960
15 Claims. (Cl. 260—239.55)

The present invention provides a new process for the manufacture of compounds containing an 11β:18-oxygen bridge by which both 11β:18-oxido-steroids and semi-acetals of 11β-hydroxy-steroid-18-als or lactones of 11β-hydroxy-steroid-18-acids can be manufactured.

Of all these types of compounds several representatives are known, for example, 11β:18-oxido-progesterone which has been found to have anti-aldosterone activity, aldosterone (a semiacetal of an 11β-hydroxy-pregnane-18-al) as well as the 18:11-lactone of corticosterone-18-acid having natriuretic activity. By the process of the invention there may thus be obtained valuable therapeutically useful compounds. If the substituents characteristic of e.g. aldosterone and the other therapeutically useful steroids mentioned, are not present in the starting materials to be used in the present process, such substituents may be formed according to methods known in the art. Thus, e.g. if there is present in 3-position a free or esterified hydroxyl group, this can be converted into an oxo group by known dehydrogenation procedures, such as by oxidation with compounds of hexavalent chromium. A double bond in 4:5-position may be introduced by bromination of the 3-ketones and subsequent elimination of hydrogen bromide with a tertiary amine, such as collidine. A 21-hydroxy group can be introduced in 21-unsubstituted products by way of bromination and exchange of the 21-bromine atom for iodine and treatment with potassium acetate with subsequent hydrolysis or by condensation with oxalic acid ester, iodination, treatment with sodium acetate and hydrolysis. Alternatively a 21-hydroxy group may be introduced by microbiological procedures, e.g. by incubation with fungi of the species *Wojnowicia graminis* or *Ophiobolus herpotrichus*.

According to the new process for the manufacture of steroids containing an 11β:18-oxygen bridge an 18-oxygenated 11α-sulfonyloxy-steroid is treated with a basic agent.

Thus, the new process involves a reversal of the configuration of the hydroxyl function at carbon atom 11. While such reversals have already been observed in several other steroid-sulfonic acid esters, more especially the tosylates, it has hitherto not been possible to convert an 11α-sulfonyloxy-steroid directly into an 11β-hydroxy compound or into a derivative thereof because the basic treatment was always accompanied by elimination of the sulfonyloxy group with formation of a double bond. It was therefore always necessary either to convert an 11α-hydroxy-steroid by oxidation into an 11-oxo compound and reducing the latter or via a 9:11-unsaturated steroid by addition of hypobromous acid, if desired followed by a reduction, into 11β-hydroxy-steroids.

The present invention is based on the observation that when an 11α-sulfonyloxy steroid which contains in position 18 a free or esterified hydroxyl group or an oxo group or an acid group is subjected to the basic treatment, it yields readily derivatives of 11β-hydroxy compounds.

Thus, 11α-sulfonyloxy-18-hydroxy compounds form in the process of this invention 11β:18-oxido compounds; 11α-sulfonyloxy-18-oxo-steroids yield 18:11-semiacetals of 11β-hydroxy-18-als; and 11α-sulfonyloxy-18-acids form 18:11-lactones of 11β-hydroxy-18-acids. 11α-sulfonyl-oxy-18-oxo-steroids, in which the 18-oxo-group is bound in a semiacetal linkage to a 20-hydroxyl group, are converted into 11β:18;18:20-bis-oxido-steroids.

Suitable basic agents are such agents which are capable of forming an oxygen anion in position 18, e.g. a hydroxide or alkoxide of an alkali metal or alkaline earth metal, for example sodium hydroxide, potassium hydroxide, barium hydroxide, sodium methylate, potassium tertiary butylate, sodium isopropylate, lithium ethylate or the like or an alkali metal carbonate, for example sodium carbonate or potassium carbonate, or an amine, such as triethylamine, tripropylamine, morpholine, piperidine, methylpiperidine or the like. In the course of this reaction 18-hydroxy compounds are temporarily converted into alkoxides. By addition of the aforementioned bases on to the carbonyl group 18-aldehydes likewise yield oxygen anions, while 18-acids are converted into 18-carboxylate anions which then react with the 11α-tosylate group. In the case of steroids in which the position 18 is occupied by an aldehyde group, the exchange of the 11α-sulfonyloxy group for the β-oxy-group can be achieved even by treatment with a salt of a strong base with a weak acid, for example an alkali salt of a carboxylic acid, for example potassium acetate or lithium acetate, sodium propionate or the like.

The reaction according to the present invention is carried out in an anhydrous or aqueous diluent, for example in an alcohol such as methanol, ethanol, isopropanol, tertiary butanol, or in a ketone such as acetone or methylethyl ketone, in aqueous dioxane or tetrahydrofuran. When the starting material used contains in position 18 an esterified hydroxyl group or an esterified or lactonized acid group, the reaction is advantageously carried out in an aqueous medium to ensure that the ester groups are hydrolyzed or respectively the lactones opened. When on the other hand an 18:20-lactone of 11α-sulfonyloxy-20-hydroxy-pregnane-18-acid is treated under anhydrous or practically anhydrous conditions with an alkoxide of an alkali metal, more especially a methoxide or ethoxide of an alkali metal, 18-alkoxy-11β:18;18:20-bis-oxido-steroids are obtained; when these latter products are heated with an aqueous acid they yield 11β:18-lactones of 20-hydroxy-steroid-18-acids.

The starting materials contain in position 11α a hydroxyl group esterified with an aliphatic or aromatic sulfonic acid, for example with methanesulfonic, ethanesulfonic, benzenesulfonic, paratoluenesulfonic acid or the like and in position 18 a free or esterified hydroxyl group, or a free oxo group or an oxo group semiacetalized with a 20-hydroxyl group, or a free or esterified acid group or an acid group lactonized with a 20-hydroxyl group. These starting materials are easy to manufacture from 18-unsubstituted steroids. Thus, from 18:20-oxido-pregnanes 18:20-diacyloxy-pregnanes can be obtained by treatment with an acylating agent, such as acetic anhydride and boron trifluoride. The diacylates may be hydrolyzed in known manner to 18:20-dihydroxy pregnanes which on oxidation for example with chromium trioxide give 18:20-lactones of 20-hydroxy-pregnane-18-acids. 18-oxopregnanes are produced by oxidation of 18-unsubstituted 20-hydroxy-pregnanes with excess lead tetraacetate in the presence of iodine in cyclohexane solution, followed by treatment with potassium acetate and hydrolysis. If desired these semiacetals can be oxidized to the above mentioned 18:20-lactones.

The starting materials to be used in the present process, more especially such as contain an esterified hydroxyl group in position 21, can also be manufactured by converting an 11α-sulfonic acid ester of a Δ⁴-3:20-dioxo-11α-hydroxy-21-acyloxy-pregnene into an 11α-sulfonic acid ester of a Δ⁴-3-oxo-11α:20-dihydroxy-21-acyloxy-pregnene by reduction with a complex metal hydride, such, for example, as sodium borohydride or lithium-tri-tertiary butoxy aluminum hydride and subsequent oxidation with aluminum tertiary butylate or aluminum isopropylate in benzene with acetone at 20–25° C. After nitrosation of the 20-hydroxyl group, for example with nitrosyl chloride in pyridine, the 20-nitrite ester is irradiated with light of a wavelength of over 300 m$\mu$, whereby the nitroso group of the nitrite ester is transferred to the 18-position to form an 18-oxime of the 20-hydroxy-compound. The 20-hydroxyl group is oxidized to a 20-oxo group, for example with chromium trioxide, and the resulting 18-oxime is then hydrolyzed under acidic conditions, for example with dilute glacial acetic acid in the presence of an alkali metal nitrite at room temperature, or with a mineral acid in acetone, to yield an 11$\alpha$-sulfonic acid ester of a $\Delta^4$-3:18:20-trioxo-11$\alpha$-hydroxy-21-acyloxy-pregnene which, after the treatment according to the present process, gives direct rise to an aldosterone-21-ester.

As specific starting materials there may be mentioned, for example: 11$\alpha$-sulfonic acid esters of the 18:20-lactone of $\Delta^4$-3-oxo-11$\alpha$:20$\alpha$- and 20$\beta$-di-hydroxy-pregnene-18-acid and of its 3-ketal, and of the 18:20-semiacetal of $\Delta^4$-3:18-dioxo-11$\alpha$:20$\alpha$- and 20$\beta$-dihydroxy pregnene and of its 3-ketal.

The following examples illustrate the present process:

Example 1

A solution of 184 mg. of the 18:20-lactone of $\Delta^4$-3-oxo-11$\alpha$-tosyloxy-20$\beta$-hydroxy-pregnene-18-acid in 10 cc. of absolute alcohol is treated with 185 mg. of potassium carbonate and 1 cc. of water, and the whole is refluxed for 6 hours under nitrogen, then treated with 0.5 cc. of glacial acetic acid, diluted with 100 cc. of methylene chloride and the solution is repeatedly washed with water. The organic solution is dried and evaporated, to yield 134 mg. of the crude amorphus 18:11-lactone of $\Delta^4$-3-oxo-11$\beta$:20$\beta$-dihydroxy-pregnene-18-acid.

A solution of the crude product in 2.0 cc. of glacial acetic acid is mixed with a solution of 100 mg. of chromium trioxide in 0.5 cc. of water. The mixture is kept for 3 hours at room temperature, diluted with methylene chloride, washed with sodium sulfite solution and water and the methylene chloride solution is dried and evaporated in a water-jet vacuum, to yield 115 mg. of a crystalline crude product which is revealed by paper chromatography to consist of the 18:11-lactone of $\Delta^4$-3:20-dioxo-11$\beta$-hydroxy-pregnene-18-acid contaminated with a small amount of the 18:20-lactone of $\Delta^4$-3:11-dioxo-20$\beta$-hydroxy-pregnene-18-acid. By filtration through 2 grams of silica gel and elution with a 9:1-mixture of benzene and ethyl acetate the by-product is easy to separate. By means of ethyl acetate 90 mg. of the pure 18:11-lactone of $\Delta^4$-3:20-dioxo-11$\beta$-hydroxy-pregnene-18-acid can be isolated which melts at 182–185° C. after recrystallization from acetone+ether. Optical rotation [$\alpha$]$_D$=+170° (in chloroform). Ultraviolet spectrum: maximum at 238 m$\mu$ ($\epsilon$=17500).

The tosylate used as starting material can be prepared in the following manner:

350 mg. of the 18:20-lactone of $\Delta^4$-3-oxo-11$\alpha$-acetoxy-20$\beta$-hydroxy-pregnene-18-acid in 35 cc. of methanol are treated with 5 cc. of water and 350 mg. of potassium carbonate, and the whole is refluxed for 4 hours under nitrogen, then treated with 1.0 cc. of glacial acetic acid, concentrated in a water-jet vacuum to about 10 cc. and extracted with methylene chloride. After having been washed with water and dried, the methylene chloride extract yields 324 mg. of the 18:20-lactone of $\Delta^4$-3-oxo-11$\alpha$:20$\beta$-dihydroxy-pregnene-18-acid which melts at 174–175° C. after recrystallization from methylene chloride+ether. Optical rotation [$\alpha$]$_D$=+86° in chloroform); ultraviolet spectrum: maximum at 241 m$\mu$ ($\epsilon$=16200); infra-red spectrum: bands at 2.76$\mu$ (hydroxyl); 5.69$\mu$ ($\gamma$-lactone; 5.98 and 6.19 ($\Delta^4$-3-ketone).

A solution of 240 mg. of the 18:20-lactone of $\Delta^4$-3-oxo-11$\alpha$:20$\beta$-dihydroxy-pregnene-18-acid in 3 cc. of methylene chloride is treated with 1.0 cc. of pyridine and 300 mg. of para-toluenesulfonyl chloride, and the whole is kept for 3 days at room temperature, then diluted with methylene chloride, and washed with dilute sulfuric acid and with water. Crystallization of the residue of the methylene chloride solution from methylene chloride+ether yields 255 mg. of the 18:20-lactone of $\Delta^4$-3-oxo-11$\alpha$-tosyloxy-20$\beta$-hydroxy-pregnene-18-acid melting at 142–144° C. (with decomposition). Optical rotation [$\alpha$]$_D$=+48° (in chloroform); absorption maximum in the ultra-violet spectrum at 229 m$\mu$ ($\epsilon$=24800); infra-red spectrum: bands at 5.69$\mu$ ($\gamma$-lactone); 5.96 and 6.17$\mu$ ($\Delta^4$-3-ketone); 6.24, 8.44 and 8.54$\mu$ (tosylate).

Example 2

A solution of 290 mg. of the 18:20-lactone of $\Delta^5$-3-ethylenedioxy-11$\alpha$:20$\beta$-dihydroxy-pregnene-18-acid in 3.0 cc. of pyridine is treated with 250 mg. of paratoluenesulfonyl chloride and kept for 3 days at room temperature. The reaction mixture is then poured into a mixture of 450 mg. of potassium carbonate, 2.4 cc. of water and 24 cc. of alcohol, and the whole is heated for 6 hours at the boil under nitrogen; after cooling, the solution is buffered with solid carbon dioxide, saturated sodium chloride solution is added and the reaction mixture is repeatedly extracted with methylene chloride. The extracts are washed with water and dried and yield on evaporation 275 mg. of the crude 18:11-lactone of $\Delta^5$-3-ethylenedioxy-11$\beta$:20$\beta$-dihydroxy-pregnene-18-acid.

The latter compound can also be prepared by boiling the crystalline 18:20-lactone of $\Delta^5$-3-ethylenedioxy-11$\alpha$-tosyloxy-20$\beta$-hydroxy-pregnene-18-acid with potassium carbonate in alcohol as described above.

A solution of 275 mg. of the crude 18:11-lactone of $\Delta^5$-3-ethylenedioxy-11$\beta$:20-dihydroxy-pregnene-18-acid in 5 cc. of pyridine is added to a mixture of 600 mg. of chromium trioxide and 18 cc. of pyridine. The reaction mixture is stirred for 8 hours at 60–65° C., then cooled, diluted with 50 cc. of ice water and 50 cc. of methylene chloride and filtered through silica gel. In the filtrate the organic layer is separated, washed with a solution of potassium dihydrophosphate and water and evaporated to dryness in a water-jet vacuum. The residue is dissolved in benzene and filtered through a column of 5.0 grams of silica gel. Impurities are eluted with 100 cc. of benzene and with 200 cc. of a 9:1 mixture of benzene and ethyl acetate. The following 100 cc. of benzene+ethyl acetate 9:1-mixture and 100 cc. of benzene+ethyl acetate 1:1-mixture elute a total of 181 mg. of the 18:11-lactone of $\Delta^5$-3-ethylenedioxy-11$\beta$:hydroxy-20-oxo-pregnene-18-acid which melts at 239.5–240.5° C. after having been recrystallized from methylene chloride+ether. Optical rotation [$\alpha$]$_D$=+1° (in chloroform).

The compounds used as starting material can be prepared in the following manner:

1.59 grams of the 18:20-lactone of $\Delta^4$-3-oxo-11$\alpha$-acetoxy-20$\beta$-hydroxy-pregnene-18-acid in 100 cc. of benzene are treated with 16 cc. of ethylene glycol and 80 mg. of para-toluenesulfonic acid, and the whole is refluxed for 8 hours at a bath temperature of 130° C. with the use of a water separator, then diluted with benzene, washed with sodium bicarbonate solution until neutral, and the benzolic solution is dried and evaporated in vacuo. Crystallization of the residue from methylene chloride+ether yields 1.585 grams of the 18:20-lactone of $\Delta^5$-3-ethylenedioxy-11$\alpha$-acetoxy-20$\beta$-hydroxy-pregnene-18-acid melting at 235–238° C. Optical rotation [$\alpha$]$_D$=−34° (in chloroform); infrared spectrum: bands at 5.68$\mu$ ($\gamma$-lactone), 5.76$\mu$ (acetate), 9.01$\mu$ and 9.15$\mu$ (ketal).

A solution of 939 mg. of this 11$\alpha$-acetoxy-3-ketal in 100 cc. of methanol is treated with 1.0 gram of potassium carbonate in 10 cc. of water, and the whole is refluxed for 4 hours under nitrogen, cooled, concentrated to about 20 cc. in a water-jet vacuum and repeatedly extracted with methylene chloride. The extracts are washed first with water to which 7 cc. of 2 N-acetic acid have been added and then with plain water. The dried methylene chloride extracts yield 900 mg. of the crystalline, crude 18:20-lactone of $\Delta^5$-3-ethylenedioxy-11$\alpha$:20$\beta$-dihydroxy-pregnene-18-acid which on recrystallization from methylene chloride+ether melts at 199–202° C. Optical rotation $[\alpha]_D = -25.5°$ (in chloroform). Infra-red spectrum: bands at 2.75 and 2.85$\mu$ (hydroxyl free and associated), 5.68$\mu$ ($\gamma$-lactone), 9.05 and 9.13$\mu$ (ketal).

A solution of 500 mg. of the above 11$\alpha$-hydroxy-lactone in 3.0 cc. of pyridine is treated with 500 mg. of para-toluene-sulfonyl chloride and kept for 2 days at room temperature. The mixture is then poured into 30 cc. of water, the crystal lumps formed are squashed, suction-filtered and the filter residue is thoroughly washed with water. Crystallization from methylene chloride+ether yields 633 mg. of the pure 18:20-lactone of $\Delta^5$-3-ethylenedioxy - 11$\alpha$ - tosyloxy - 20$\beta$ - hydroxy - pregnene-18-acid melting at 139–141° (with decomposition). Optical rotation $[\alpha]_D = -38.5°$ (in chloroform). Infra-red spectrum: bands at 5.69$\mu$ ($\gamma$-lactone), 6.24, 8.44 and 8.54$\mu$ (tosylate) and 9.02/9.14$\mu$ (ketal). Ultra-violet spectrum: maximum at 226 m$\mu$ ($\epsilon$=13150).

In an analogous manner to that described above there may be obtained from the 18:20-lactone of $\Delta^5$-3-ethylenedioxy-11$\alpha$-acetoxy-20$\alpha$-hydroxy-pregnene-18-acid melting at 250–256° C. the 18:20-lactone of $\Delta^5$-3-ethylenedioxy-11$\alpha$-tosyloxy-20$\alpha$-hydroxy-pregnene-18-acid whose further conversion is described in Example 5.

*Example 3*

A solution of 500 mg. of $\Delta^4$-3-oxo-11$\alpha$-tosyloxy-18-hydroxy-18:20$\beta$-oxido-pregnene in 8 cc. of dimethyl formamide is treated with 500 mg. of anhydrous potassium acetate and heated for 3 hours at 100° C. under nitrogen, then cooled, poured in 100 cc. of water, and the whole is repeatedly extracted with methylene chloride. The extracts are washed three times with water, dried and evaporated, to yield 380 mg. of the crude $\Delta^4$-3-oxo-11$\beta$:18;18:20$\beta$-bis-oxido-pregnene as a pale-yellow oil.

The $\Delta^3$-3-oxo-11$\alpha$-tosyloxy-18-hydroxy-18:20$\beta$-oxido-pregnene used as starting material can be prepared in the following manner:

A solution of 800 mg. of $\Delta^5$-3-ethylenedioxy-11$\alpha$:18-dihydroxy-18:20$\beta$-oxido-pregnene in 20 cc. of absolute methanol is treated with 5.0 cc. of 2 N-methanolic hydrochloric acid and the mixture is kept for 24 hours at 25° C. The reaction mixture is then evaporated to dryness in a water-jet vacuum; the residue, which contains $\Delta^4$-3-oxo - 11$\alpha$ - hydroxy - 18 - methoxy - 18:20 - oxido-pregnene, is taken up in 5 cc. of pyridine, 600 mg. of para-toluenesulfonic acid are added, and the whole is kept for 48 hours at room temperature, then poured into 100 cc. of ice water and repeatedly extracted with methylene chloride. The extracts are washed successively with N-hydrochloric acid, sodium bicarbonate solution and with water, dried and evaporated. The residue (950 mg.) is dissolved in 50 cc. of acetic acid of 80% strength and the solution is heated for 10 minutes at 100° C., and then evaporated to dryness in a water-jet vacuum. The resulting crude $\Delta^4$-3-oxo-11$\alpha$-tosyloxy-18-hydroxy-18:20$\beta$-oxido-pregnene is used as it is.

*Example 4*

A solution of 320 mg. of $\Delta^5$-3-ethylenedioxy-11$\alpha$-tosyloxy-18:20$\beta$-diacetoxy-pregnene in 20 cc. of absolute alcohol is treated with 400 mg. of potassium carbonate and 4 cc. of water and refluxed for 6 hours under nitrogen, then cooled, the solution is buffered with solid carbon dioxide, treated with saturated sodium chloride solution and repeatedly extracted with methylene chloride. The extracts are washed with water, dried and evaporated, to yield 230 mg. of crude $\Delta^5$-3-ethylene-dioxy-11$\beta$:18-oxido-20$\beta$-hydroxy-pregnene.

The latter compound is oxidized with chromium trioxide in pyridine at 60–65° C. as described in Example 2, to yield 195 mg. of $\Delta^5$-3-ethylenedioxy-11$\beta$:18-oxido-20-oxo-pregnene; when it is treated for 10 minutes at 100° C. with dilute acetic acid it yields 11$\beta$:18-oxido-progesterone.

The $\Delta^5$-3-ethylenedioxy-11$\alpha$-tosyloxy-18:20$\beta$-diacetoxy-pregnene used as starting material is prepared in the following manner:

A solution of 900 mg. of the 18:20-lactone of $\Delta^5$-3-ethylenedioxy - 11$\alpha$ - acetoxy - 20$\beta$ - hydroxy - pregnene-18-acid in 15 cc. of tetrahydrofuran is added to a suspension of 1.0 gram of lithium aluminum hydride in 20 cc. of tetrahydrofuran. The mixture is stirred with exclusion of moisture first for one hour at room temperature and then for 1 hour at 60° C. A mixture of 10 cc. of tetrahydrofuran and 5 cc. of ethyl acetate is then added, and after a further hour 20 cc. of water are slowly dropped in. The mixture is poured into 150 cc. of methylene chloride, agitated with 100 cc. of water, suction-filtered and the organic solution is repeatedly washed with water. The dried organic solution yields 900 mg. of $\Delta^5$-3-ethylenedioxy-11$\alpha$:18:20$\beta$-trihydroxy-pregnene. This compound is mixed with 2.2 molecular equivalents of acetanhydride in pyridine and kept for 24 hours at room temperature, then poured into water, extracted with methylene chloride and the extracts are repeatedly washed with water. From the crude reaction mixture $\Delta^5$-3-ethylenedioxy-11$\alpha$-hydroxy-18:20$\beta$-diacetoxy-pregnene can be separated by chromatography on alumina. A mixture of 220 mg. of this compound and 200 mg. of paratoluenesulfonyl chloride and 8 cc. of pyridine is kept for 48 hours at room temperature, then poured into 80 cc. of water, the precipitate is suctioned off and taken up in methylene chloride. After having been washed with water and dried, the methylene chloride solution yields crude $\Delta^5$-3-ethylenedioxy-11$\alpha$-tosyloxy-18:20$\beta$-diacetoxy-pregnene (245 mg.).

*Example 5*

A solution of 0.75 cc. of triethylamine in 15 cc. of dioxane and 1.5 cc. of water is treated with 739 mg. of the 18:20-lactone of $\Delta^5$-3-ethylenedioxy-11$\alpha$-tosyloxy-20$\beta$-hydroxy-pregnene-18-acid and the mixture is heated for 6 hours at 90–100° C. 7.5 cc. of water are then added and the reaction mixture is evaporated almost to dryness in a water-jet vacuum. The residue is taken up in methylene chloride and the solution is washed with water, dried and evaporated. The residue (524 mg.) is dissolved in benzene and filtered through 15 grams of alumina. 70 cc. of benzene elute 102 mg. of the 18:20-lactone of $\Delta^{5\cdot9\cdot11}$-3-ethylenedioxy-20$\beta$-hydroxy-pregnadiene-18-acid which melts at 193–200° C. after having been crystallized from methylene chloride+ether. The following benzene fraction contains only a few mg. of an impure product. 70 cc. of ethyl acetate then elute 410 mg. of the 18:11-lactone of $\Delta^5$-3-ethylene-dioxy-11$\beta$:20$\beta$-dihydroxy-pregnene-18-acid. After having been crystallized from methylene chloride+ether the compound melts at 224–226° C. Optical rotation $[\alpha]_D^{27} = -27°$ (in chloroform). Infra-red spectrum: inter alia bands at 2.76 and 2.86$\mu$ (hydroxyl free and associated), 5.66$\mu$ ($\gamma$-lactone) and 9.09$\mu$ (ketal).

In an analogous manner from the 18:20-lactone of $\Delta^5$-3-ethylenedioxy - 11$\alpha$-tosyloxy-20$\alpha$-hydroxy-pregnene-18-acid by treatment with triethylamine in dioxane there is obtained, in addition to the 18:20-lactone of $\Delta^{5\cdot9\cdot11}$-3-ethylenedioxy - 20$\alpha$ - hydroxy-pregnadiene - 18 - acid, the 18:11-lactone of $\Delta^5$-3-ethylenedioxy-11$\beta$:20$\alpha$-dihydroxy-pregnene-18-acid which when crystallized from a mixture of methylene chloride and ether melts at 164–168° C.

*Example 6*

A solution of 62 mg. of potassium hydroxide in 10 cc.

of methanol is treated with 200 mg. of the 18:20-lactone of Δ⁵-3-ethylenedioxy - 11α - tosyloxy-20β-hydroxy - pregnene-18-acid, and the mixture is heated for 6 hours at the boil under nitrogen. The tosylate, which is initially only partially soluble, has dissolved completely after 1½ hours. The whole is cooled, buffered with carbon dioxide and the solution is evaporated to dryness in a water-jet vacuum. A solution of the residue in methylene chloride is washed with water, dried and finally evaporated to dryness, to yield 136 mg. of a crystallizing residue. Recrystallization from ether and ether+pentane yields pure Δ⁵-3-ethylenedioxy - 11β:18; 18:20-bis-oxido-18-methoxy-pregnene in crystals which above 137° C. turn into spikes and finally melt at 171-173° C. Optical rotation $[\alpha]_D^{25}=-16.5°$ (in chloroform). Infra-red spectrum: inter alia no bands between 5.5 and 6.0μ; bands at 6.17, 6.89, 7.31, 8.31, 8.49μ and six strong bands between 8.90 and 10μ.

*Example 7*

A solution of 756 mg. of crude Δ⁴-3:18:20-trioxo-11α-tosyloxy-21-acetoxy-pregnene in 15 cc. of glacial acetic acid is treated with 1.0 gram of anhydrous sodium acetate and heated for 30 minutes at 100° C. The reaction mixture is allowed to cool and then treated with 150 cc. of water and repeatedly extracted with methylene chloride. The extracts are washed with dilute sodium bicarbonate solution and with water, dried, and evaporated to dryness in a water-jet vacuum. The residue (402 mg.) is dissolved in benzene and filtered through 8.0 grams of silica gel. When the fractions eluted with a 4:1-mixture of benzene and ethyl acetate are crystallized from methylene chloride+ether, they yield 297 mg. of aldosterone-21-monoacetate melting at 193.5°-195.5° C.

Δ⁴-3:18:20-trioxo - 11α - tosyloxy-21-acetoxy-pregnene, used as starting material, is prepared in the following manner:

A solution of 5.80 grams of Δ⁴-3:20-dioxo-11α-hydroxy-21-acetoxy-pregnene in 48 cc. of methylene chloride and 12 cc. of pyridine is treated with 5.4 grams of para-toluenesulfonyl chloride and kept overnight at room temperature, then diluted with 200 cc. of methylene chloride, and the mixture is washed with N-hydrochloric acid and water. The dried methylene chloride solution is evaporated and the residue crystallized from methylene chloride+ether+hexane, to yield 6.7 grams of Δ⁴-3:20-dioxo-11α-tosyloxy-21-acetoxy-pregnene which melts at 130-140° C. with decomposition.

A mixture of 5.6 grams of tertiary butanol and 1.4 cc. of tetrahydrofuran is run under nitrogen with stirring and ice-cooling into a solution of 960 mg. of lithium aluminum hydride in 20 cc. of tetrahydrofuran. When all has been added, the mixture is stirred for 30 minutes at 0° C., treated with 2.0 grams of Δ⁴-3:20-dioxo-11α-tosyloxy-21-acetoxy-pregnene, and rinsed with 1.5 cc. of tetrahydrofuran. The mixture is kept for 30 minutes at 0° C., diluted with benzene, 50 cc. of saturated Rochelle salt solution are added with efficient cooling, separated and once again extracted with benzene. Evaporation of the dried benzene solution in a water-jet vacuum yields crude Δ⁴-3:20-dihydroxy-11α-tosyloxy-21-acetoxy-pregnene.

A solution of the crude product (2.05 grams) in 60 cc. of absolute benzene is treated with 2.4 grams of aluminum tertiary butylate and 9.6 cc. of acetone, and the whole is stirred for 15 hours at 25° C. under nitrogen, then diluted with benzene, washed with cold dilute hydrochloric acid and water, and the benzene solution is dried and evaporated to dryness in a water-jet vacuum. The resulting crude Δ⁴-3-oxo-11α-tosyloxy-20-hydroxy-21-acetoxy-pregnene (2.10 grams) is purified by chromatography on 100 grams of silica gel.

A solution of 1.73 grams of pure Δ⁴-3-oxo-11α-tosyloxy-20-hydroxy-21-acetoxy-pregnene in 35 cc. of absolute pyridine is treated with 250 mg. of nitrosyl chloride in 5.35 cc. of benzene and kept for 18 hours at 10° C., then cautiously evaporated to dryness and the crude nitrite is precipitated by adding ether and hexane.

A solution of 1.21 grams of the 20-nitrite of Δ⁴-3-oxo-11α-tosyloxy-20-hydroxy-21-acetoxy-pregnene in 75 cc. of toluene is irradiated at +10° C. with a high-pressure mercury lamp until a test sample of the reaction solution indicates the complete disappearance of the nitrite band at 6.13μ (after about 2 hours). The reaction mixture is then diluted with benzene and washed with water, and the dried benzene solution is evaporated to dryness under vacuum. The residue (1.24 grams) is purified by chromatography on silica gel. The fractions eluted with ethyl acetate yield the pure 18-oxime of Δ⁴-3:18-dioxo-11α-tosyloxy-20-hydroxy-21-acetoxy-pregnene.

A solution of 827 mg. of the latter compound in 30 cc. of acetone is cooled to −10° C., 1.03 cc. of a solution of 2.672 grams of chromium trioxide in a mixture of 2.3 cc. of concentrated sulfuric acid and 6.7 cc. of water is vigorously stirred in dropwise, and after completion of the addition the whole is stirred for 5 minutes at −5° C. A solution of 2.0 grams of sodium acetate in 10 cc. of water is then added, the whole is diluted with 60 cc. of benzene, separated, washed with saturated sodium chloride solution, and the aqueous solutions are once more extracted with benzene. The organic solutions are combined and dried and evaporated in a water-jet vacuum. The resulting residue (842 mg.) is the crude 18-oxime of Δ⁴-3:18:20-trioxo-11α-tosyloxy-21-acetoxy-pregnene; it is dissolved in 24 cc. of glacial acetic acid, treated with 320 mg. of sodium nitrite in 6.4 cc. of water, and the whole is stirred for 10 minutes at room temperature. 100 cc. of methylene chloride are then added and the solution is washed with dilute sodium bicarbonate solution and with water until neutral. Each aqueous solution is once more extracted with methylene chloride. The residue (756 mg.) of the dried methylene chloride solutions contains Δ⁴-3:18:20-trioxo-11α-tosyloxy-21-acetoxy-pregnene which is further processed without first having been purified.

*Example 8*

To a solution of 9.5 grams of the 18:20-lactone of 3α-acetoxy-11α-20β-dihydroxy-pregnane-18-acid in 75 cc. of pyridine there are added at 0° C. 6.46 grams of para-toluenesulfonyl-chloride. The mixture is stirred at 0° C. until the para-toluenesulfonyl chloride has dissolved and is then allowed to stand for 2 days at room temperature. The reaction mixture is then slowly added dropwise and with stirring and cooling to a solution of 9.5 grams of sodium bicarbonate in 190 cc. of water. After stirring for one hour, the reaction mixture is extracted three times with methylene chloride and the organic solutions washed twice with ice-cold 2 N-hydrochloric acid, once with saturated ice-cold sodium bicarbonate solution and once with water. The reaction mixture is dried with sodium sulfate and evaporated at a water-jet vacuum at a bath temperature of 30° C., dissolved in benzene and again evaporated at a water-jet vacuum. In order to remove the remaining traces of pyridine the mixture is dissolved in xylene and evaporated in a high vacuum. After dissolving the residue in 100 cc. of ether, the product crystallizes. There are obtained 10.22 grams of the 18:20-lactone of 3α-acetoxy-11α-para-toluenesulfonyloxy-20β-hydroxy-pregnane-18-acid melting at 134–136° C. with decomposition. Optical rotation: $[\alpha]_D^{27}=+1°$ (c.=1.021 in chloroform). Infrared spectrum (solvent: methylene chloride): 5.69μ (γ-lactone); 5.77μ and 8.08μ (acetate) and 6.23μ, 8.41μ and 8.50μ (tosylate).

The resulting tosylate is heated with 105 cc. of dioxane, 21 cc. of water and 6 cc. of triethylamine for 6 hours in a bath at 95° C. 21 cc. of water are then added, the mixture is evaporated almost to dryness at a water-jet vacuum, a solution of 3.6 grams of potassium dihydrophosphate is added and the whole extracted with methylene chloride. After adding 0.075 cc. of phosphoric acid of 85% strength, the mixture is extracted twice with methylene chloride, the organic solutions washed with water, dried and evaporated at a water-jet vacuum. The residue is chromatographed on 300 grams of aluminum oxide (activity I), the 18:20-lactone of $\Delta^{9:11}$-3α-acetoxy-20β-hydroxy-pregnene-18-acid formed as by-product being eluted in a small quantity with a mixture of benzene and ethyl acetate (9:1). After being recrystallized from a mixture of methylene chloride and ether the product melts at 221–225° C.; optical rotation $[\alpha]_D^{25} = -19°$ (c.=1.121 in chloroform). Infra-red spectrum (solvent: methylene chloride): 5.71μ (γ-lactone) and 5.80μ and 8.09μ (acetate). The crystalline fractions obtained with a mixture of benzene and ethyl acetate (1:1) and pure ethyl acetate melt at 194.5–195.5° C. and, after being recrystallized from a mixture of methylene chloride and ether, yield 4.85 grams of the 18:11-lactone of 3α-acetoxy-11β:20β-dihydroxy-pregnane-18-acid; optical rotation $[\alpha]_D^{25} = +41.5°$ (c.=0.984 in chloroform). Infra-red spectrum (solvent: methylene chloride): 278μ (hydroxyl); 5.69μ (γ-lactone) and 5.80μ and 8.10μ (acetate).

What is claimed is:

1. In the process of introducing an 11β:18-oxido bridge into a steroid compound of the pregnane series, the step which comprises contacting a member selected from the group consisting of an 11α-sulfonyloxy-steroid of the pregnane series, in which sulfonyloxy is a member selected from the group consisting of aliphatic sulfonyloxy and aromatic sulfonyloxy and which contains in the 18-position an oxygen function selected from the group consisting of a hydroxyl group, an oxo group and an oxo group together with a hydroxyl group, and an ester thereof, with a basic agent.

2. Process as claimed in claim 1, wherein an 11α-sulfonyloxy-pregnane-18-acid is treated with a basic agent.

3. Process as claimed in claim 1, wherein an 18:20-lactone of an 11α-sulfonyloxy-20-hydroxy-pregnane-18-acid is treated in an aqueous medium with an alkali metal hydroxide.

4. Process as claimed in claim 1, wherein an 18:20-lactone of an 11α-sulfonyloxy-20-hydroxy-pregnane-18-acid is treated in an aqueous medium with an alkali metal carbonate.

5. Process as claimed in claim 1, wherein an 18:20-lactone of an 11α-sulfonyloxy-20-hydroxy-pregnane-18-acid is treated in an aqueous medium with a strongly basic amine.

6. Process as claimed in claim 1, wherein an 18:20-lactone of an 11α-sulfonyloxy-20-hydroxy-pregnane-18-acid is treated in an anhydrous lower alkanol with an alkali metal alkoxide.

7. Process as claimed in claim 1, wherein an 18:20-lactone of an 11α-sulfonyloxy-20-hydroxy-pregnane-18-acid is treated in anhydrous lower alkanol with an alkali metal alkoxide.

8. Process as claimed in claim 1, wherein an 18:20-semiacetal of an 11α-sulfonyloxy-18-oxo-20-hydroxy-pregnane is treated with an alkaline agent.

9. Process as claimed in claim 1, wherein an 11α-sulfonyloxy-18-hydroxy-pregnane is treated with an alkaline agent.

10. Process as claimed in claim 1, wherein an 11α-sulfonyloxy-18-acyloxy-pregnane is treated with an alkaline agent.

11. Process as claimed in claim 1, wherein an 11α-sulfonyloxy-18-oxo-pregnane is treated with an alkali metal acylate.

12. $\Delta^5$-ethylenedioxy-11β:18;18:20-bis-oxido - 18 - methoxy-pregnene.

13. $\Delta^4$-3:18:20-trioxo-11α-tosyloxy-21 - acetoxy - pregnene.

14. A compound selected from the group consisting o. a compound of the formula:

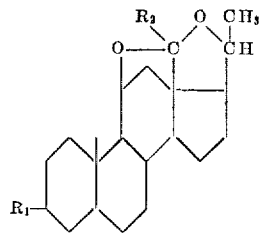

wherein $R_1$ is a member selected from the group consisting of a hydrogen atom together with a lower acyloxy group and an oxo group and $R_2$ is a lower alkoxy group, the corresponding compound with a double bond in 4,5-position in a compound in which $R_1$ is a keto group, and its $\Delta^5$-3-ethyleneketal.

15. A compound of the formula:

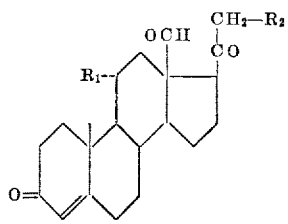

wherein $R_1$ is a sulfonyloxy group derived from an acid selected from the group consisting of a lower aliphatic sulfonic acid and a monocyclic aromatic sulfonic acid and $R_2$ is a member selected from the group consisting of a hydrogen atom and a lower acyloxy group.

No references cited.

UNITED STATES PATENT OFFICE
CERTIFICATE OF CORRECTION

Patent No. 3,085,089            April 9, 1963

Albert Wettstein et al.

It is hereby certified that error appears in the above numbered patent requiring correction and that the said Letters Patent should read as corrected below.

Column 10, line 13, for "alkal-" read -- alkali --; line 15, for "$\Delta^5$-ethylenedioxy-" read -- $\Delta^5$-3-ethylenedioxy- --; line 19, for "consisting o," read -- consisting of --.

Signed and sealed this 5th day of May 1964.

(SEAL)
Attest:

ERNEST W. SWIDER            EDWARD J. BRENNER

Attesting Officer            Commissioner of Patents